United States Patent
Wang et al.

(10) Patent No.: US 9,253,736 B2
(45) Date of Patent: *Feb. 2, 2016

(54) METHOD AND SYSTEM FOR MANAGING TRANSMITTING POWER OF COMMUNICATIONS DEVICES EQUIPPED WITH A PLURALITY OF ANTENNAS

(71) Applicant: MediaTek Singapore Pte. Ltd., Singapore (SG)

(72) Inventors: Chao-Chun Wang, Taipei (TW); YungPing Hsu, Taipei (TW); Chih-Shi Yee, Baoshan Township, Hsinchu County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,854

(22) Filed: Oct. 29, 2014

(65) Prior Publication Data
US 2015/0050957 A1    Feb. 19, 2015

Related U.S. Application Data

(63) Continuation of application No. 12/939,788, filed on Nov. 4, 2010, now Pat. No. 8,918,134.

(60) Provisional application No. 61/257,916, filed on Nov. 4, 2009.

(51) Int. Cl.
*H04B 7/00* (2006.01)
*H04W 52/26* (2009.01)
*H04W 52/42* (2009.01)
*H04B 7/06* (2006.01)

(52) U.S. Cl.
CPC .............. *H04W 52/26* (2013.01); *H04W 52/42* (2013.01); *H04B 7/0691* (2013.01)

(58) Field of Classification Search
CPC .. H04B 7/0691; H04B 7/0689; H04B 7/0693; H04B 7/0673
USPC .............................. 455/522, 69, 101; 370/318
See application file for complete search history.

(56) References Cited

U.S. PATENT DOCUMENTS 8,918,134 B2 * 12/2014 Wang et al. ................... 455/522
2002/0111183 A1    8/2002 Lundby
(Continued)

FOREIGN PATENT DOCUMENTS

| CN | 1011258730 | 9/2008 |
| CN | 1011494482 | 7/2009 |

*Primary Examiner* — Ping Hsieh
*Assistant Examiner* — Angelica M Perez
(74) *Attorney, Agent, or Firm* — McClure, Qualey & Rodack, LLP (57) ABSTRACT

A method for managing transmitting power of communications devices equipped with multiple antennas. The method enables a first antenna configuration of the plurality of antennas in accordance with a first pre-determined rule. The method transmits a first message to a peer communications device, wherein the first message comprises at least a power management profile of the communications device transmitting the first message. The method receives a second message comprising at least information pertinent to a power management profile of the peer communications device receiving the first message and signal integrity information determined by the peer communications device from the received first message. Finally, the method activates a second antenna configuration of the plurality of antennas by using the signal integrity information in accordance with a second pre-determined rule.

16 Claims, 8 Drawing Sheets

(56) References Cited

U.S. PATENT DOCUMENTS

| | | |
|---|---|---|
| 2008/0130778 A1 | 6/2008 | Xia et al. |
| 2008/0247370 A1 | 10/2008 | Gu et al. |
| 2011/0053527 A1 | 3/2011 | Hunzinger |
| 2011/0105059 A1* | 5/2011 | Gaal et al. .................. 455/127.1 |

* cited by examiner

| Element ID | Length | Transmitter transmit Power | Receiver transmit Power | Antenna Elements |
|---|---|---|---|---|
| 1 | 1 | 1 | 1 | 1 |

FIG. 9

METHOD AND SYSTEM FOR MANAGING TRANSMITTING POWER OF COMMUNICATIONS DEVICES EQUIPPED WITH A PLURALITY OF ANTENNAS

CROSS REFERENCE TO RELATED APPLICATIONS

This application is a Continuation of pending U.S. patent application Ser. No. 12/939,788, filed on Nov. 4, 2010, which claims the benefit of U.S. Provisional Application No. 61/257,916 filed 2009 Nov. 4 and entitled "Method and system for managing transmitting power of communications devices equipped with a plurality of antennas". The entire contents of which are hereby incorporated by reference.

BACKGROUND OF THE INVENTION

1. Field of the Invention

The invention relates to a method and system for managing transmitting power of communications devices, and more particularly to a method and system for managing transmitting power of communications devices equipped with a plurality of antennas.

2. Description of the Related Art

A communications system operating at a millimeter wave (mmWave) band has a number of advantages. For example, the mmWave band is cleaner than the commonly used ISM (Industrial, Scientific, and Medical) bands because there is less interference. An mmWave channel is capable of supporting high throughput, of up to several gigabits per second. Signals transmitted at the mmWave band can be made highly directional with the proper antenna design; therefore communications devices operating at the mmWave band often employ directional antennas for efficiency and application reasons. Because the communications devices operating at the mmWave band generally employ multiple antennas, by determining proper antenna configurations in a beamforming training procedure, desired radiation patterns, such as a point to point radiation pattern, may be obtained.

However, one disadvantage in the mmWave band communications system is that the power consumption is generally high. Especially, when there is large amount of antennas equipped within the communications devices operating at the mmWave band communications system. Therefore, a method and system for managing transmitting power of communications devices equipped with a plurality of antennas is required.

BRIEF SUMMARY OF THE INVENTION

Methods for managing transmitting power of a communications device equipped with a plurality of antennas Communications system and methods for managing transmitting power of one or more communications devices and a communications system are provided. An embodiment of a method for managing transmitting power of a communications device equipped with a plurality of antennas comprises: enabling a first antenna configuration of the plurality of antennas in accordance with a first pre-determined rule; transmitting a first message to a peer communications device, wherein the first message comprises at least the power management profile of the communications device transmitting the first message; receiving a second message comprising at least information pertinent to the power management profile of the peer communications device receiving the first message and signal integrity information determined by the peer communications device from the received first message; and activating a second antenna configuration of the plurality of antennas by using the signal integrity information in accordance with a second pre-determined rule.

Another embodiment of a method for managing transmitting power of a communications device equipped with a plurality of antennas comprises: enabling a first antenna configuration of the plurality of antennas in accordance with a first pre-determined rule; receiving a first message from a peer communications device, wherein the first message comprises at least the power management profile of the peer communications device transmitting the first message; transmitting a second message comprising at least information pertinent to a power management profile of the communications device, and signal integrity information determined by the communications device from the received first message; and activating a second antenna configuration of the plurality of antennas.

Another embodiment of a communications system comprises a first communications device equipped with a first plurality of antennas and a second communications device equipped with a second plurality of antennas. The first communications device enables a first antenna configuration in accordance with a first pre-determined rule. The second communications device activates a second antenna configuration in accordance with a second predetermined rule. A first message and a second message are exchanged between the first and second communications devices, wherein the first message comprises at least the power management profile of the first communications device transmitting the first message and the second message comprises at least information pertinent to a power management profile of the second communications device, and signal integrity information determined by the second communications device from the received first message. The first communications device enables a third antenna configuration in accordance with the first pre-determined rule after the first and second messages have been exchanged, and the second communications device activates a fourth antenna in accordance with the second pre-determined rule configuration after the first and second messages have been exchanged.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
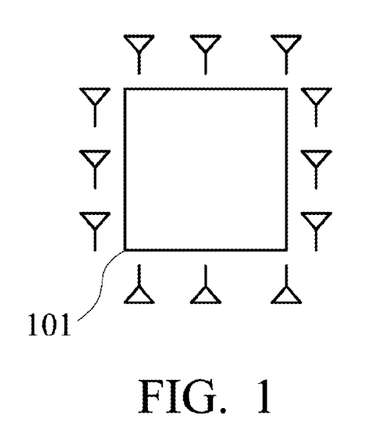
FIG. 1 shows a sectorized antenna structure utilized by a communications device according to an embodiment of the invention.
Figure 2:
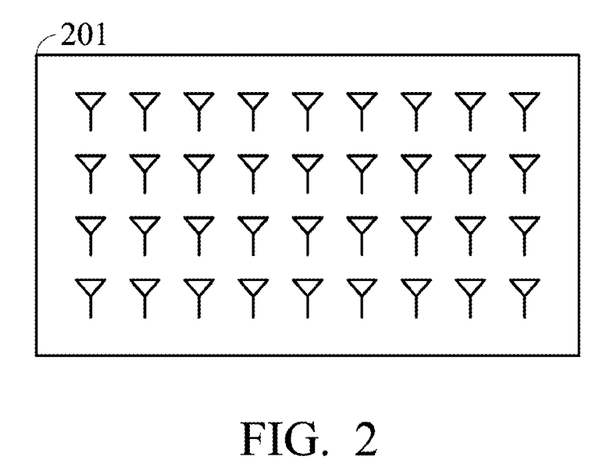
FIG. 2 shows a phase array antenna structure of a communications device according to another embodiment of the invention.
Figure 3:
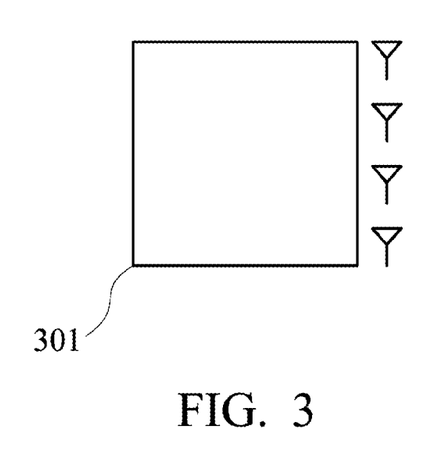
FIG. 3 shows a linear antenna structure of a communications device according to yet another embodiment of the invention.

As previously discussed, the communications devices operating in a mmWave band communications system may be equipped with a plurality of antennas. FIG. 1 shows a sectorized antenna structure utilized by a communications device 101 according to an embodiment of the invention. The antennas on each side of the square cover a 90 degree sector. Thereby, a nearly 360 degree omni-directional radiation pattern may be obtained. FIG. 2 shows a phase array antenna structure of a communications device 201 according to another embodiment of the invention. In this structure, a plurality of antennas are arranged to form as an array, and by controlling the layout and the number of active antennas, the transmitting power and weighting of each antenna, different radiation patterns may be achieved. FIG. 3 shows a linear antenna structure of a communications device 301 according to yet another embodiment of the invention. In this structure, a plurality of antennas are arranged to form as a line and different radiation patterns may also be achieved by controlling the layout and number of active antennas, the transmitting power and weighting of each antenna.

Figure 4:
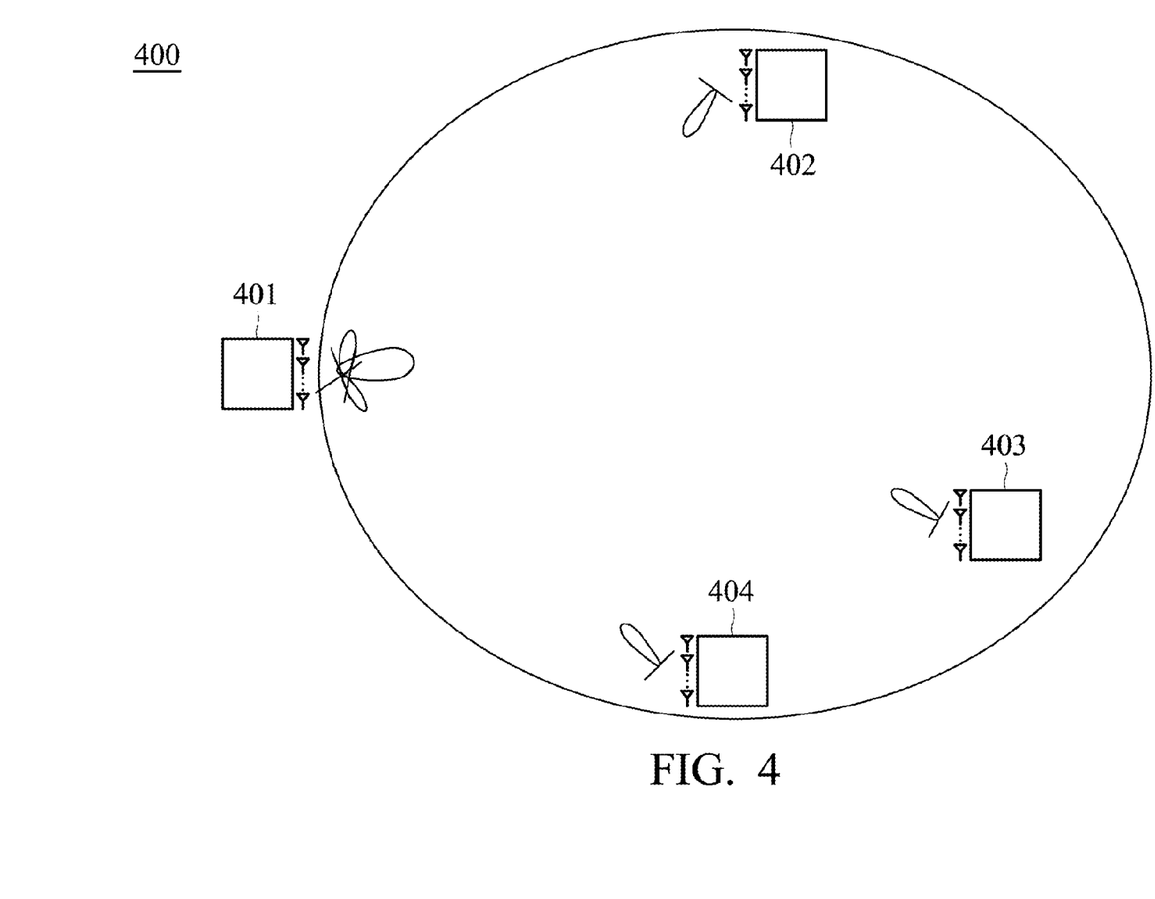
FIG. 4 shows a communications system according to an embodiment of the invention.

FIG. 4 shows a communications system according to an embodiment of the invention. A communications system 400 may comprise a plurality of communications devices, for example, the communications devices 401~404. Each of the communications devices may be equipped with a plurality of antennas and may have a power management profile comprising the information at least one of the number of active antennas, an layout of antenna elements, characteristics of a radio channel between a pair of communications devices, the gain of power amplifier, the current transmit power level, etc. According to an embodiment of the invention, any of the communications devices in the communications system 400 may act as a transmitter communications device that initiate a transmit power control (TPC) procedure. The other communications device(s) within the reach of the transmitting signal may be the receiver communications device(s) to cooperatively implement the TPC procedure initiated by the transmitter communications device. Note that the linear antenna structure of communications devices 401~404 is shown here as merely an exemplary embodiment of the invention so as to simplify the drawing for a clearer understanding of the concepts the invention. Any other antenna structures and configurations carried out by the plurality of antennas equipped within the communications devices may also be utilized and the invention should not be limited thereto.

According to a concept of the invention, a communications device equipped with a plurality of antennas may manage the transmitting power more efficiently by controlling not only the output power of power amplifier, but also the antenna configuration and/or number of active antenna elements. In the embodiments, a pair of communications devices is capable of adaptively managing the power consumption required to exchange data between them by controlling the antenna configuration, the number of active antenna elements and/or gain of power amplifier, cooperatively. In the TPC procedure, a communications device (transmitter) may use a TPC Request and Adjustment frames to request another communications device (receiver) to report and suggest to change its transmit power, antenna configuration and/or number of active antenna elements. The receiver may respond with a TPC Response frame to report its transmit power, antenna configuration, number of active antenna elements and/or channel conditions. Note that according to another aspect of the invention, in the TPC procedure, the transmit power, antenna configuration and/or number of active antenna elements of the transmitter may also be changed as well. The method disclosed in the present invention comprises a multi-phase handshaking protocol which includes antenna elements as a key parameter to manage the power management profile of the transmitting and receiving communications devices.

Figure 5:
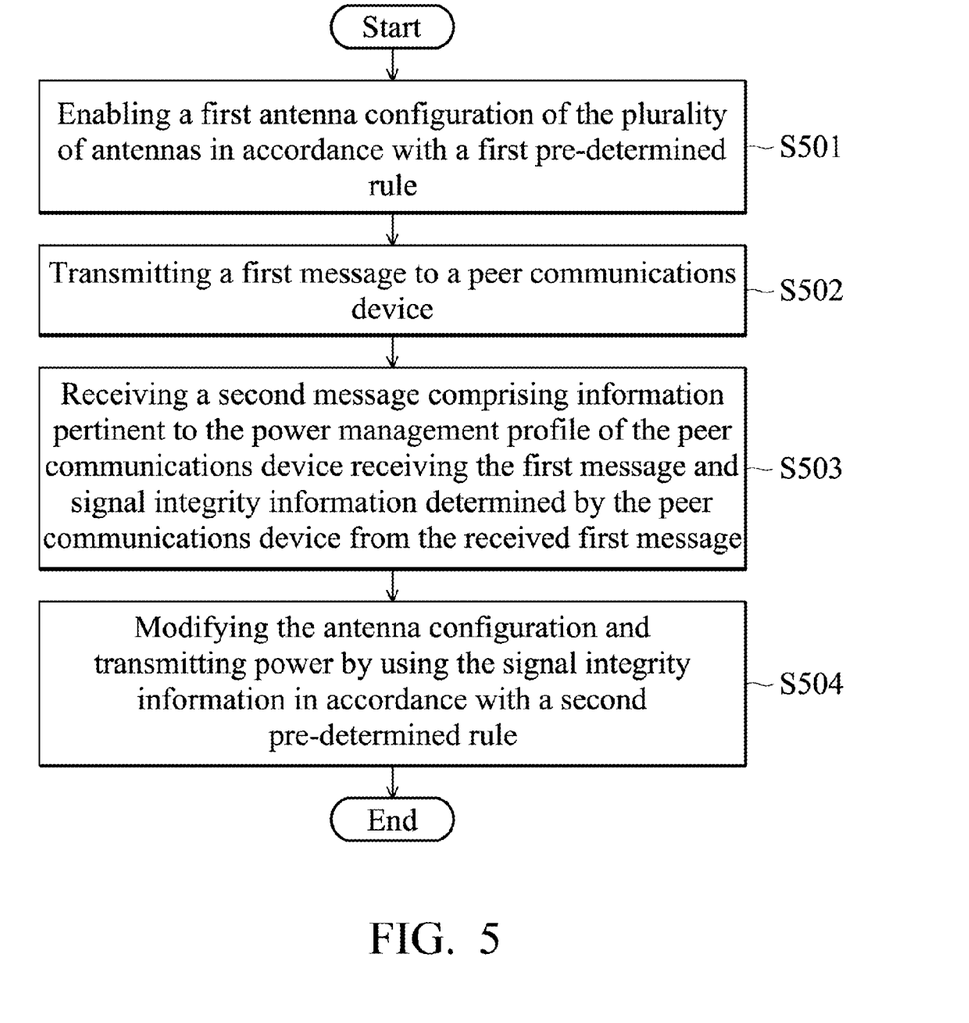
FIG. 5 shows a flow chart of a method for managing transmitting power of a communications device equipped with a plurality of antennas in a communications system from a transmitter's perspective according to an aspect of the invention.

FIG. 5 shows a flow chart of a method for managing transmitting power of a communications device equipped with a plurality of antennas in a communications system from a transmitter's perspective according to an aspect of the invention. The communications device equipped with the plurality of antennas may first enable a first antenna configuration of the plurality of antennas in accordance with a first pre-determined rule (step S501). According to an embodiment of the invention, the first pre-determined rule is for the communications device to initiate an antenna configuration in accordance with a set of parameters may comprise the level of transmitting power, a radiation pattern with a pre-determined angle and/or a pre-determined placement of the plurality of antennas, or others. For example, the communications device initiate the antenna configuration with minimum power, or maximum power, or a radiation pattern with widest angle, or a radiation pattern with the smallest angle, or a pattern otherwise determined by a Beam Forming protocol.

Next, the communications device equipped with the plurality of antennas may transmit a first message to a peer communications device (step S502). The first message comprises at least the power management profile of the communications device transmitting the first message. In one embodiment, the first message further comprises a request (for example, a TPC Request frame which will be introduced in more detail in the following paragraph) for requesting information pertinent to a power management profile of the peer communications device receiving the first message. In another embodiment, the first message further comprises a recommendation for adjusting the power management profile of the peer communications device receiving the first message.

As previously described, the power management profile may comprise at least the information about an antenna configuration, the number of active antenna elements, the gain of power amplifier, etc. Note that according to another embodiment of the invention, the power management profile of the communications device equipped with the plurality of antennas (i.e. the transmitter) may be comprised in the first message to facilitate the TPC procedure, and the invention should not be limited thereto.

Next, the communications device equipped with the plurality of antennas may receives a second message (for example, a TPC Report frame which will be introduced in more detail in the following paragraph) comprising information pertinent to the power management profile of the peer communications device receiving the first message and signal integrity information determined from the received first message (step S503). According to an embodiment of the invention, the signal integrity information may be determined by the receiver according to the received first message for indicating characteristic(s) of a channel through which the first message is received. The signal integrity information may be obtained by, for example but not limited to, measuring the Signal to Noise Ration (SNR), Bit Error Rate (BER), or others of the radio signals embedding the first message.

Finally, the communications device equipped with the plurality of antennas may modify the antenna configuration and transmitting power by using the signal integrity information in accordance with a second pre-determined rule (Step S504). According to an embodiment of the invention, the second pre-determined rule may be that for the communications device equipped with the plurality of antennas to compute minimum power required for an antenna configuration while maintaining a radio link with the peer communications device receiving the first message. According to another embodiment of the invention, the second pre-determined rule may be that for the communications device equipped with the plurality of antennas to compute power required for an antenna configuration in order to increase the reach of radio signals.

Figure 6:
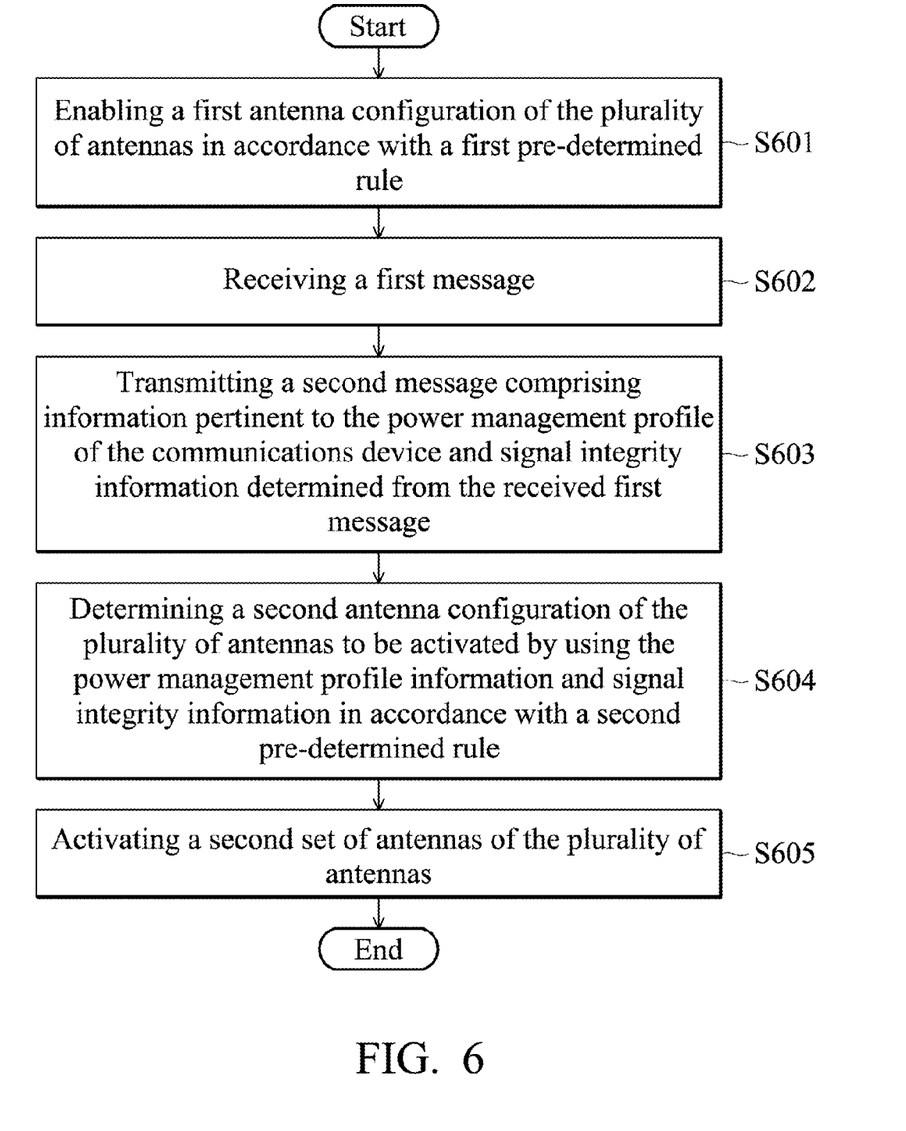
FIG. 6 shows a flow chart of a method for managing transmitting power of a communications device equipped with a plurality of antennas in a communications system from a receiver's perspective according to another aspect of the invention.

FIG. 6 shows a flow chart of a method for managing transmitting power of a communications device equipped with a plurality of antennas in a communications system from a receiver's perspective according to another aspect of the invention. The communications device equipped with the plurality of antennas (i.e. a receiver) may first enable an antennas configuration of the plurality of antennas in accordance with a first pre-determined rule (Step S601). According to an embodiment of the invention, the first pre-determined rule is for the communications device equipped with the plurality of antennas (i.e. the receiver) to initiate the antenna configuration in accordance with a set of parameters may comprise the level of transmitting power, a radiation pattern with a pre-determined angle and/or a pre-determined placement of the plurality of antennas, or others. For example, the communications device equipped with the plurality of antennas may initiate the antenna configuration with minimum gain, or maximum gain, or a radiation pattern with widest angle, or a radiation pattern with the smallest angle, or a pattern otherwise determined by a Beam Forming protocol.

Next, the communications device equipped with the plurality of antennas may receive a first message (for example, a TPC adjustment frame which will be introduced in more detail in the following paragraph). The first message comprises at least the power management profile of the peer communications device transmitting the first message. In one embodiment, the first message further comprises a request for requesting information pertinent to a power management profile of the communications device receiving the first message. In another embodiment, the first message further comprises a recommendation for adjusting the power management profile of the communications device receiving the first message.

Next, the communications device equipped with the plurality of antennas may transmits a second message (for example, a TPC Report frame which will be introduced in more detail in the following paragraph) comprising information pertinent to the power management profile of the communications device and signal integrity information determined from the received first message (step S603) According to an embodiment of the invention, the signal integrity information may be determined by the communications device (i.e. the receiver) according to the received message for indicating characteristic(s) of a channel through which the message is received. The signal integrity information may be obtained by, for example but not limited to, measuring the Signal to Noise Ration (SNR), Bit Error Rate (BER), or other quality metrics of the radio signals embedding the first message.

Next, the communications device equipped with the plurality of antennas may determine a second antenna configuration of the plurality of antennas to be activated by using the power management profile information and signal integrity information in accordance with a second pre-determined rule (Step S604). Note that the second antenna configuration may be the same or different from the first set of antennas. Finally, the communications device equipped with the plurality of antennas may activate a second set of antennas of the plurality of antennas (Step S605).

Figure 7:
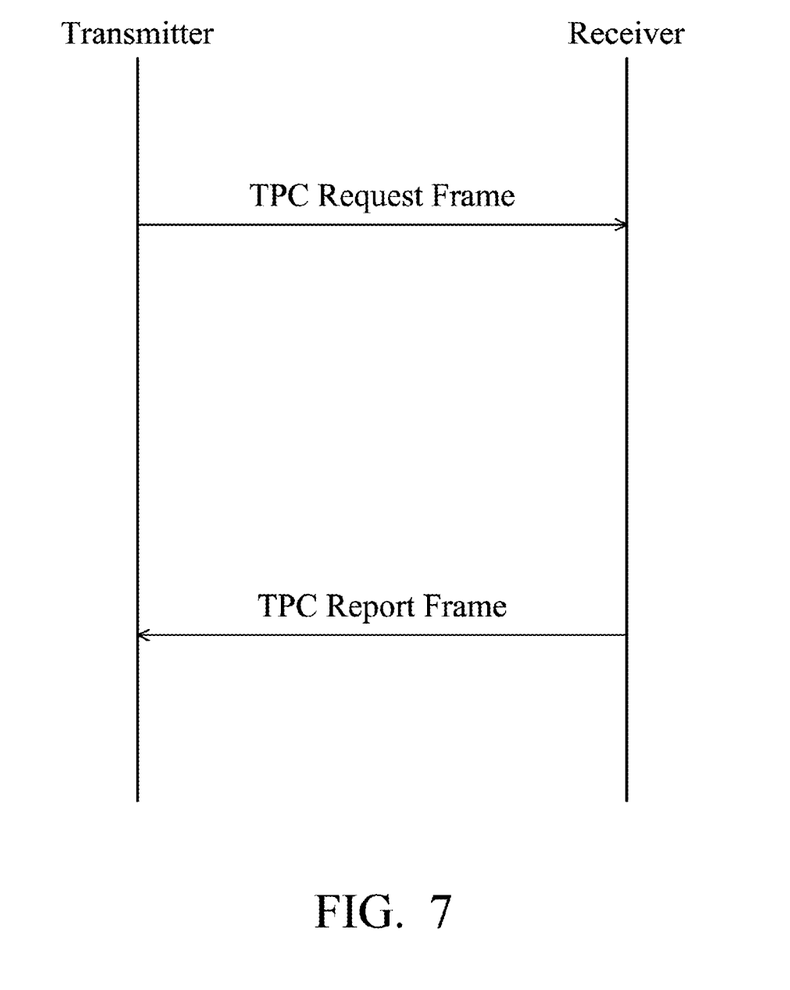
FIG. 7 shows an exemplary message flow of the multi-phase handshaking protocol according to an embodiment of the invention.

FIG. 7 shows an exemplary message flow of the multi-phase handshaking protocol according to an embodiment of the invention. As previously described, in the embodiments of the invention, any of the communications devices, such as the communications devices 401~404 in the communications system 400, may act as a transmitter communications device that initiates a transmit power control (TPC) procedure. As shown in FIG. 7, a first communications device (i.e. the transmitter) may transmit a message (i.e. the TPC request frame as shown) for requesting information pertinent to a current power management profile of a peer communications device (i.e. the receiver). In the embodiments of the invention, the current power management profile may comprises the channel information, transmitting power, gain of a receiver module, number of active antennas and/or an antenna configuration of the receiver communications device that are currently used. According to another embodiment of the invention, as previously described, the transmitter communications device may also transmit information pertinent to a current power management profile of the transmitter communications device to the receiver communications device to facilitate the TPC procedure, and the invention should not be limited thereto.

In response to the message of the TPC request frame, the receiver communications device may respond with a message (i.e. the TPC report frame as shown) for reporting the information pertinent to the current power management profile of itself. Note that according to another embodiment of the invention, the peer communications device may also transmit a message comprising an acknowledgement of the reception of first request and an indication of the actual message contains all the pertinent information the transmitter requested to facilitate the TPC procedure, and the invention should not be limited thereto.

Upon receiving the information pertinent to the current power management profile of the peer communications device, the transmitter communications device may further determine a suggested power management profile for the peer communications device, and suggest the receiver communications device to change from its current power management profile to the suggested power management profile, accordingly. In one embodiment, the suggested power management profile comprises at least transmitting power, a number of active antennas and/or an antenna configuration for the receiver communications device to adopt.

Figure 8:
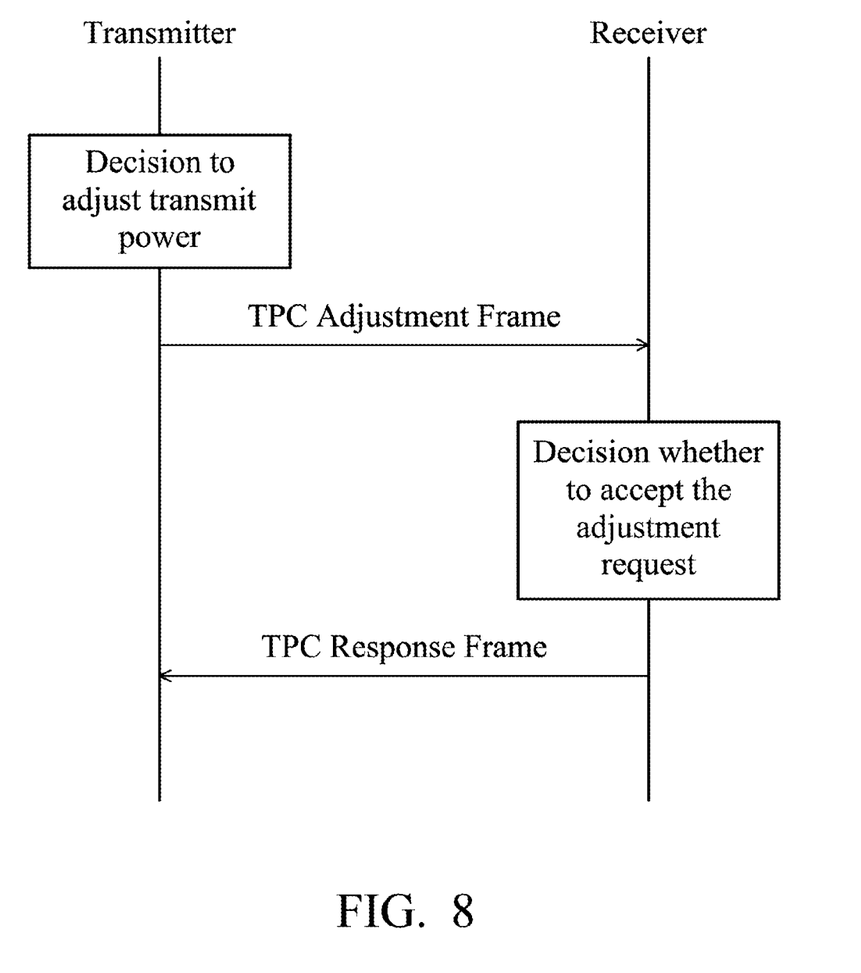
FIG. 8 shows an exemplary message flow of the multi-phase handshaking protocol according to another embodiment of the invention.

FIG. 8 shows an exemplary message flow of the multi-phase handshaking protocol according to another embodiment of the invention. Note that in the embodiments of the invention, no matter whether the current power management profile of the receiver communications device has been received or not, the transmitter communications device may decide to request adjustment of the transmit power of the receiver communications device in a TPC procedure. Therefore, the TPC handshaking messages as shown in FIG. 7 are not necessarily to be transmitted before the TPC handshaking messages as shown in FIG. 8.

As shown in FIG. 8, based on the decision to adjust transmit power of the receiver communications device, the transmitter communications device transmit a message (i.e. the TPC adjustment frame as shown) for requesting the receiver communications device to adjust from its current power management profile to a suggested power management profile. As previously described, the suggested power management profile may comprise at least transmitting power, number of active antennas and/or an antenna configuration for the receiver communications device that are suggested or recommended to be adjusted to. Note that in one embodiment, the TPC request frame message and the TPC adjustment frame message may have the same fields but one which is to indicate a request for information and another one is a request for adjustment.

After receiving the TPC adjustment frame, the receiver communications device further decides whether to accept the adjustment request, and determines a committed power management profile according to the received suggested power management profile and signal integrity information determined from the received message(s). According to the embodiment of the invention, the committed power management profile may comprise at least transmitting power, number of active antennas and/or an antenna configuration that the receiver communications device intends to adjust to. After the decision, the receiver communications device may further transmit a message (i.e. the TPC response frame as shown) comprising information pertinent to the committed power management profile in response to the TPC adjustment frame. Another embodiment of the message send by the receiver communications device in response to the TPC adjustment frame is an acknowledgement for indicating receiving and accepting the committed power management profile. Another embodiment of the message, send by the receiver communications device in response to the TPC adjustment frame, comprises an acknowledgement of the reception of the adjustment request and an indication of the actual message contains all the pertinent information the transmitter requested to adjust.

Figure 9:
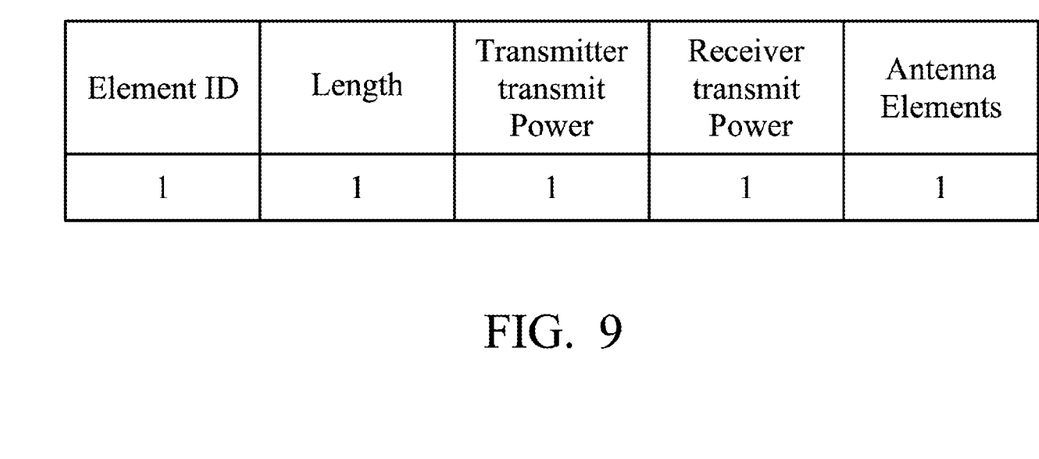
FIG. 9 shows an exemplary format of the TPC request/adjustment frame according to an embodiment of the invention.

FIG. 9 shows an exemplary format of the TPC request/adjustment frame according to an embodiment of the invention. The Element ID field is set to indicate whether the frame is a TPC request or adjustment frame. The Length field should be set to the actual length of the TPC request/adjustment frame. In the TPC request/adjustment frame, the transmitter refers to the communications device transmitting the TPC adjustment frame and the receiver refers to the communications device receiving the TPC adjustment frame. Note that FIG. 9 is merely one exemplary frame format to implement proposed the multi-phase handshaking protocol, and the invention should not be limited thereto. Those who are skilled in this technology can make various alterations and modifications without departing from the scope and spirit of this invention. Therefore, the scope of the present invention shall be defined and protected by the following claims and their equivalents.

The Transmitter Transmit power field may be set to the current transmit power in request frame and proposed transmitting power the transmitter communications device intends to use in adjustment frame. The transmitter communications device may determine whether its transmit power should be increased or decreased by using the link margin information received in the TPC report and the transmit power transmitting the TPC request frame.

The Receiver Transmit Power field may be set to a proposed transmit power the receiver communications device could use in the adjustment frame and zero in the request frame. The transmitter communications device may determine whether the transmit power of the receiver communications device should be increased or decreased by measuring the link margin and the information about the transmit power received in the TPC report frame or the received second message.

The Antenna Elements field may be set to a value representing the number of or a particular configuration of active antenna elements in the transmitter communications device. In a TPC Adjustment frame the Antenna Elements field may be set to a value representing the number of or a particular configuration of active antenna elements proposed for the receiver communications device. According to the embodiments of the invention, the number of antennas to be activated or antenna configuration suggested by the transmitter communications device may be determined according to the information carried in the TPC report.

According to another embodiment of the invention, the format as shown in FIG. 9 may also be applied in the TPC report and response frame. Again, the Element ID field is set to indicate whether the frame is a TPC report and response frame. The Length field should be set to the actual length of the TPC report/response frame. A communications device receiving a TPC request may measure the link margin while receiving the TPC request frame and returns all the pertinent information in the report frame. The Transmitter Transmit power field should be set to the current transmit power in report frame and proposed transmitting power the transmitter communications device intends to use in response frame. The Receiver Transmit Power field may be set to zero. The Antenna Elements field may be set to a value representing the number of active antenna elements or the antenna configuration of the transmitting communications device in the response frame.

In the TPC response frame, the transmitter is the communications device transmitting the corresponding TPC adjustment frame and the receiver is the communications device receiving the corresponding TPC adjustment element. According to an embodiment of the invention, if the receiver communications device accepted the proposed transmitter transmit power and the number of active antenna elements or the antenna configuration, the same values are copied to the corresponding fields. Otherwise, the receiver communications device may determine a committed power management profile according to the received suggested power management profile indicated in the adjustment frame and the signal integrity as previously described. The committed power management profile may comprise at least transmitting power and an antenna configuration, such as a number of antennas to be activated, or the antenna configuration that the second communications device intends to adjust to. For example, the receiver communications device may determines whether the transmit power and the number of active antenna elements should be increased or decreased while maintaining the necessary link margin in the response frame.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for managing transmitting power of a communications device equipped with a plurality of antennas, comprising:
    enabling a first antenna configuration of the plurality of antennas in accordance with a first pre-determined rule;
    transmitting a first message to a peer communications device, wherein the first message comprises at least a power management profile of the communications device transmitting the first message, wherein the power management profile of the communications device is a profile of parameter(s) used by the communications device;
    receiving a second message comprising at least information pertinent to a power management profile of the peer communications device receiving the first message and signal integrity information determined by the peer communications device from the received first message, wherein the power management profile of the peer communications device is a profile of parameter(s) used by the peer communications device; and
    activating a second antenna configuration of the plurality of antennas by using the signal integrity information in accordance with a second pre-determined rule;
    wherein the communications device enabling a third antenna configuration in accordance with the first pre-determined rule after the first and second messages have been exchanged.

2. The method as claimed in claim 1, wherein the first message further comprises a request for requesting information pertinent to the power management profile of the peer communications device receiving the first message.

3. The method as claimed in claim 1, wherein the first message further comprises a recommendation for adjusting the power management profile of the peer communications device receiving the first message.

4. The method as claimed in claim 3, wherein the recommendation comprises at least one of a number of active antennas, a layout of antenna configuration and transmitting power of the number of active antennas.

5. The method as claimed in claim 3, wherein the recommendation comprises a number of active antennas, a layout of antenna configuration and transmitting power of the number of active antennas respectively.

6. The method as claimed in claim 1, wherein the second message is an acknowledgement with an indication message, and the indication message comprises at least information pertinent to the power management profile of the peer communications device receiving the first message and signal integrity information determined by the peer communications device.

7. The method as claimed in claim 1, wherein the first pre-determined rule is for the communications device equipped with the plurality of antennas to initiate an antenna configuration in accordance with a set of parameters comprises the level of transmitting power, a radiation pattern with a pre-determined angle and/or a pre-determined placement of the plurality of antennas.

8. The method as claimed in claim 1, wherein the signal integrity information is determined according to the received first message by the peer communications device receiving the first message for indicating characteristic(s) of a channel through which the first message is received.

9. The method as claimed in claim 1, wherein the second pre-determined rule is for the communications device equipped with the plurality of antennas to compute minimum power required for an antenna configuration while maintaining a radio link with the peer communications device receiving the first message.

10. The method as claimed in claim 1, wherein the second pre-determined rule is for the communications device equipped with the plurality of antennas to compute power required for an antenna configuration in order to increase reach of radio signals to the peer communications device receiving the first message.

11. A method for managing transmitting power of a communications device equipped with a plurality of antennas in a communications system, comprising:
    enabling a first antenna configuration of the plurality of antennas in accordance with a first pre-determined rule;
    receiving a first message from a peer communications device, wherein the first message comprises at least a power management profile of the peer communications device transmitting the first message and the power management profile of the peer communications device is a profile of parameter(s) used by the peer communications device;
    transmitting a second message comprising at least information pertinent to a power management profile of the communications device, and signal integrity information determined by the communications device from the received first message, wherein the power management profile of the communications device is a profile of parameter(s) used by the communications device; and
    activating a second antenna configuration of the plurality of antennas;
    wherein the communications device enabling a third antenna configuration in accordance with the first pre-determined rule after the first and second messages have been exchanged.

12. The method as claimed in claim 11, wherein the first message further comprises a request for requesting information pertinent to the power management profile of the communications device receiving the first message.

13. The method as claimed in claim 11, wherein the first message further comprises a recommendation for adjusting the power management profile of the communications device receiving the first message.

14. The method as claimed in claim 13, wherein the recommendation comprises a number of active antennas, a layout of antenna configuration and transmitting power of the number of active antennas respectively.

15. The method as claimed in claim 11, wherein the first pre-determined rule is for the communications device equipped with the plurality of antennas to initiate an antenna configuration in accordance with a set of parameters comprises the level of transmitting power, a radiation pattern with a pre-determined angle and/or a pre-determined placement of the plurality of antennas.

16. The method as claimed in claim 11, wherein the second pre-determined rule is for the communications device equipped with the plurality of antennas to compute minimum power required for an antenna configuration while maintain a radio link with a communications device transmitting the first message.

* * * * *